United States Patent
Watanabe et al.

(10) Patent No.: US 7,327,266 B2
(45) Date of Patent: Feb. 5, 2008

(54) NON-CONTACT COMMUNICATION SYSTEM INFORMATION CARRIER

(75) Inventors: Hiroto Watanabe, Ibaraki (JP); Kazuhiko Daido, Ibaraki (JP)

(73) Assignee: Hitachi Maxell, Ltd., Ibaraki-Shi (JP)

(*) Notice: Subject to any disclaimer, the term of this patent is extended or adjusted under 35 U.S.C. 154(b) by 216 days.

(21) Appl. No.: 10/518,299

(22) PCT Filed: Jun. 17, 2003

(86) PCT No.: PCT/JP03/07678

§ 371 (c)(1),
(2), (4) Date: Dec. 17, 2004

(87) PCT Pub. No.: WO03/107268

PCT Pub. Date: Dec. 24, 2003

(65) Prior Publication Data

US 2006/0016895 A1    Jan. 26, 2006

(30) Foreign Application Priority Data

Jun. 17, 2002 (JP) .............................. 2002-176270

(51) Int. Cl.
*G08B 13/14* (2006.01)
(52) U.S. Cl. ................... 340/572.8; 340/572.1
(58) Field of Classification Search ............. 340/572.1, 340/572.7, 572.8; 343/787, 788, 842, 878, 343/895; 235/492, 493
See application file for complete search history.

(56) References Cited

U.S. PATENT DOCUMENTS

| 5,703,395 | A | | 12/1997 | Berney |
| 5,982,284 | A | * | 11/1999 | Baldwin et al. ......... 340/572.8 |
| 6,021,949 | A | | 2/2000 | Boiron |
| 6,160,526 | A | * | 12/2000 | Hirai et al. ................. 343/895 |
| 6,264,109 | B1 | | 7/2001 | Chapet et al. |
| 6,861,992 | B2 | * | 3/2005 | Kawakami et al. ......... 343/741 |
| 6,897,827 | B2 | * | 5/2005 | Senba et al. ................ 343/873 |
| 6,927,738 | B2 | * | 8/2005 | Senba et al. ................ 343/787 |
| 7,088,249 | B2 | * | 8/2006 | Senba et al. ............. 340/572.8 |

FOREIGN PATENT DOCUMENTS

| JP | 5-50790 A | | 3/1993 |
| JP | 9-501533 A | | 2/1997 |
| JP | 2002-7989 A | | 1/2002 |
| JP | 2003-16408 A | | 1/2003 |
| WO | WO 02/07078 A1 | * | 1/2002 |
| WO | WO 02/07081 A1 | * | 1/2002 |

* cited by examiner

*Primary Examiner*—Van T. Trieu
(74) *Attorney, Agent, or Firm*—Birch, Stewart, Kolasch & Birch, LLP

(57) ABSTRACT

A contactless communication system information carrier which is high in handleability and yield but low in cost is provided. It includes a core piece 11 in which an IC chip 1 with an antenna coil 3 integrally formed on one surface is fitted inside a recess 6 of a core piece body 5, a non-metal spacer 14 in which the core piece 11 is fitted to a fitting part 16 located in a center of the spacer 14 to retain the core piece 11, and a metal weight 15 placed and coupled so as to surround an outer periphery of the spacer 14. The antenna coil 3 and the metal weight 14 are separated from each other via the spacer 14.

14 Claims, 15 Drawing Sheets

NON-CONTACT COMMUNICATION SYSTEM INFORMATION CARRIER

TECHNICAL FIELD

The present invention relates to a contactless communication system information carrier which includes a semiconductor device in which a contactless antenna is integrally formed with an integrated circuit (IC) chip.

Conventionally, it has been proposed to attach an IC chip with an antenna coil integrally formed therewith to parts and products for use in inventory control of the parts and products and so on. Also proposed is a personal identification card in which an IC chip with an antenna coil integrally formed therewith is embedded in the card body for use in access control, commuter ticket, and so on.

However, the IC chip with which an antenna coil is integrally formed is solid, and the chip surface where the coil is formed is subject to damage by contact with another IC chip. Thus, these IC chips cannot be supplied in bags or by parts feeder, and they require expensive material handling.

Further, the IC chip with which an antenna coil is integrally formed is as thin as about 0.2 mm to 0.6 mm, being highly brittle. Thus, the chip surface with the coil (or the backside surface) is subject to crack or chip out due to stress, which makes fabrication difficult.

Furthermore, though insert molding of a chip using a synthetic resin is possible, it has disadvantages that moldability is low, multi-cavity mold is difficult, and costs are high due to a great difference in the physical characteristics between the IC chip with an antenna coil and a mold resin.

The insert molding also has a problem that the thermal expansion due to an embedded resin and the stress strain generated during use directly affect the IC chip, which can lead to the circuit breakdown of the IC chip in the worst case.

A coin-shaped IC tag, such as described in Japanese Unexamined Patent Application Publication No. 2002-007989, for example, has been proposed conventionally. The coin IC tag is formed in the following way, as shown in FIGS. 26A and 26B. First, a polyurethane adhesive 52 is applied to both sides of a polyethylene terephthalate film 51, and an antenna coil 53 is formed by etching and an IC chip 54 is mounted on the adhesive 52 of one side, thereby making an IC film 55 with the IC mounted.

Meanwhile, metal powder such as stainless steel is mixed with polyamide resin and molded into the same area as the IC film 55, thereby making mold plates 56a and 56b. Then, the IC film 55 is placed between the mold plates 56a and 56b, and heat and pressure are applied thereto to melt the polyurethane adhesive 52 on both sides of the film 51, thereby integrating the three together. The coin IC tag is thereby produced. The numerical symbol 57 in FIG. 26A designates a recess for preventing the IC chip 54 from being broken when the pressure is applied to the IC film 55 and the mold plates 56a and 56b to integrate them together.

Use of the two mold plates 56a and 56b mixed with the metal powder allows the coin IC tag to be heavier. This can avoid errors in equipment using the coin IC tag due to underweight.

However, in this coin IC tag, it is impossible to handle the IC film 55 placed in between in the process of placing the IC film 55 and the two mold plates 56a and 56b on one another in a metal mold and applying heat and pressure thereto to melt the adhesive 52 to integrate the three together. This causes misalignment of the IC film 55 and the mold plates 56a and 56b to lead to defective appearance, thus decreasing yields.

Further, since the antenna coil 53 and the IC chip 54 are mounted on the adhesive 52, which is heated and melted to attach the IC film 55 to the mold plates 56a, if the adhesive 52 is too thick, the pitch of the antenna coil 53 can be out of order or the connection part of the IC chip 54 can be deformed. If, on the other hand, the adhesive 52 is too thin, the adhesive strength of the IC film 55 and the mold plates 56a and 56b is so low that the mold plates 56a and 56b can be detached from the IC film 55 in a drop test of the coin IC tag.

An object of the present invention is to solve the above problems of the conventional techniques and provide a contactless communication system information carrier with superior handleability and high yield.

DISCLOSURE OF THE INVENTION

A first embodiment of the present invention to achieve the above object includes a core piece in which an IC chip with an antenna coil integrally formed on one surface is fitted inside a recess of a core piece body; a non-metal spacer in which the core piece is fitted to a fitting part located in a center of the spacer to retain the core piece; and a metal weight placed and coupled so as to surround an outer periphery of the spacer, wherein the antenna coil and the metal weight are separated from each other via the spacer.

In the first embodiment, the IC chip with the antenna coil integrally formed therewith is mounted inside the recess of the core piece body, thereby protecting the surface where the coil is formed and making an easily handled size to allow supply in bags or by parts feeder. It is thereby possible to provide a contactless communication system information carrier which is high in handleability and yield but low in cost. Even if the type, shape, specification, and so on of the information carrier are different, making a certain shape of an attachment part (mounting part) to the core piece allows common use of a core piece to reduce costs. Since parts are assembled by fitting only or by fitting and insert-molding, the manufacture is easier and the production efficiency is higher than conventional ones. The metal weight allows increasing the weight of the communication system information carrier. Since the antenna coil and the metal weight are separated from each other via the spacer, it eliminates a negative effect of the weight on the communication and increases the selection of a metal to form the weight.

A second embodiment of the present invention is that, in the first embodiment, the fitting part of the spacer comprises a bottomed recess or a through hole, and the core piece body is forcibly fitted into the fitting part. Since the fitting part of the spacer comprises a bottomed recess or a through hole, and the core piece body is forcibly fitted into the fitting part, the both parts are closely contacted by plane, and thereby the second embodiment allows more secure attachment of the core piece body and the spacer.

A third embodiment of the present invention is that, in the second embodiment, an outer peripheral surface of the core piece body has an annular convex portion or an annular groove, an inner peripheral surface of the fitting part of the spacer has an annular groove or an annular convex portion, and the annular convex portion and the annular groove are fitted to each other. Since the outer peripheral surface of the core piece body has an annular convex portion or an annular groove, the inner peripheral surface of the fitting part of the spacer has an annular groove or an annular convex portion, and the annular convex portion and the annular groove are fitted to each other, the third embodiment allows more secure attachment of the core piece body and the spacer.

A fourth embodiment of the present invention is that, in the first embodiment, the fitting part of the spacer comprises a bottomed recess, and an inner peripheral surface of the fitting part or an outer peripheral surface of the core piece body has an air vent groove. Since the fitting part of the spacer comprises a bottomed recess, and the inner peripheral surface of the fitting part or the outer peripheral surface of the core piece body has the air vent groove, the fourth embodiment allows releasing the air when fitting the core piece to the fitting part of the spacer, thus fitting the core piece more reliably.

A fifth embodiment of the present invention is that, in the first embodiment, the weight has a through hole in a center part thereof, and a spacer made of a synthetic resin is forcibly fitted into the through hole. Since the spacer made of a synthetic resin, which is relatively soft, is forcibly fitted into the through hole of the weight made of metal, which is solid, the fifth embodiment allows more reliable retention of the spacer by the weight.

A sixth embodiment of the present invention is that, in the fifth embodiment, an inner peripheral surface of the through hole has a locking rib, which cuts into an outer peripheral surface of the spacer by forcibly fitting the spacer into the through hole. Since the locking rib formed inside the through hole of the weight cuts into the outer peripheral surface of the spacer, the sixth embodiment allows secure attachment of the weight and the locking rib.

A seventh embodiment of the present invention is that, in the first embodiment, the weight has a through hole in a center part thereof, and a spacer made of a synthetic resin is insert-molded into the through hole. Since the spacer is insert-molded into the through hole of the weight, the seventh embodiment allows treating the weight and the spacer as one part, thereby simplifying assembly of the contactless communication system information carrier.

An eighth embodiment of the present invention is that, in the seventh embodiment, an inner peripheral surface of the through hole has a locking rib, which cuts into an outer peripheral surface of the spacer by forcibly fitting the spacer into the through hole. Since the locking rib formed inside the through hole of the weight cuts into the outer peripheral surface of the spacer, the eighth embodiment allows secure attachment of the weight and the locking rib.

A ninth embodiment of the present invention includes an IC chip having an antenna coil for contactless communication integrally formed on one surface, a non-metal resin member packaging the IC chip, and a weight at least partly or wholly made of metal, placed and coupled so as to surround the resin member. This allows protecting the surface where the coil is formed and making an easily handled size, permitting supply in bags or by parts feeder. It is thereby possible to provide a contactless communication system information carrier which is high in handleability and yield but low in cost. Even if the type, shape, specification, and so on of the information carrier are different, making a certain shape of an attachment part (mounting part) to the core piece allows common use of a core piece, thereby reducing costs. Since parts are assembled by fitting only or by fitting and insert-molding, the manufacture is easier and the production efficiency is higher than conventional ones.

A tenth embodiment of the present invention is that, in the ninth embodiment, the weight is made of a composition of a metal and a synthetic resin. This allows formation by injection molding, thereby increasing production efficiency.

An eleventh embodiment of the present invention is that, in the ninth embodiment, the contactless communication system information carrier is coin-shaped, and the IC chip is mounted in a central part of the contactless communication system information carrier. The insertion direction of the contactless communication system information carrier is thereby not restricted, allowing better usability.

A twelfth embodiment of the present invention includes a core piece in which an IC chip with an antenna coil integrally formed on one surface is fitted inside a recess of a core piece body, a spacer made of a synthetic resin not including a metal, in which the core piece is fitted to a fitting part located in a center the spacer to retain the core piece, and a weight made of a composition of a metal and a synthetic resin, placed to surround an outer periphery of the spacer, wherein the spacer and the weight are formed by coinjection molding, and the antenna coil and the metal weight are separated from each other via the spacer.

In the twelfth embodiment, the IC chip with the antenna coil integrally formed therewith is mounted inside the recess of the core piece body, thereby protecting the surface where the coil is formed and making an easily handled size to allow supply in bags or by parts feeder. It is thereby possible to provide a contactless communication system information carrier which is high in handleability and yield but low in cost. Even if the type, shape, specification, and so on of the information carrier are different, making a certain shape of an attachment part (mounting part) to the core piece allows common use of a core piece to reduce costs. Since parts are assembled by fitting only or by fitting and insert-molding, the manufacture is easier and the production efficiency is higher than conventional ones. The metal weight allows increasing the weight of the communication system information carrier. Since the antenna coil and the metal weight are separated from each other via the spacer, it eliminates a negative effect of the weight on the communication and increases the selection of a metal to form the weight.

A thirteenth embodiment of the present invention is that, in the twelfth embodiment, the fitting part of the spacer comprises a bottomed recess or a through hole, and the core piece body is forcibly fitted into the fitting part. Since the fitting part of the spacer comprises a bottomed recess or a through hole, and the core piece body is forcibly fitted into the fitting part, the both parts are closely contacted by plane, and thereby the thirteenth embodiment allows more secure attachment of the core piece body and the spacer.

A fourteenth embodiment of the present invention is that, in the thirteenth embodiment, an outer peripheral surface of the core piece body has an annular convex portion or an annular groove, an inner peripheral surface of the fitting part of the spacer has an annular groove or an annular convex portion, and the annular convex portion and the annular groove are fitted to each other. Since the outer peripheral surface of the core piece body has an annular convex portion or an annular groove, the inner peripheral surface of the fitting part of the spacer has an annular groove or an annular convex portion, and the annular convex portion and the annular groove are fitted to each other, the fourteenth embodiment allows more secure attachment of the core piece body and the spacer.

A fifteenth embodiment of the present invention is that, in the twelfth embodiment, the fitting part of the spacer comprises a bottomed recess, and an inner peripheral surface of the fitting part or an outer peripheral surface of the core piece body has an air vent groove. Since the fitting part of the spacer comprises a bottomed recess, and the inner peripheral surface of the fitting part or the outer peripheral surface of the core piece body has the air vent groove, the fifteenth embodiment allows releasing the air when fitting the core piece to the fitting part of the spacer, thus fitting the core piece more reliably.

BEST MODES FOR CARRYING OUT THE INVENTION

First Embodiment

Figure 1:
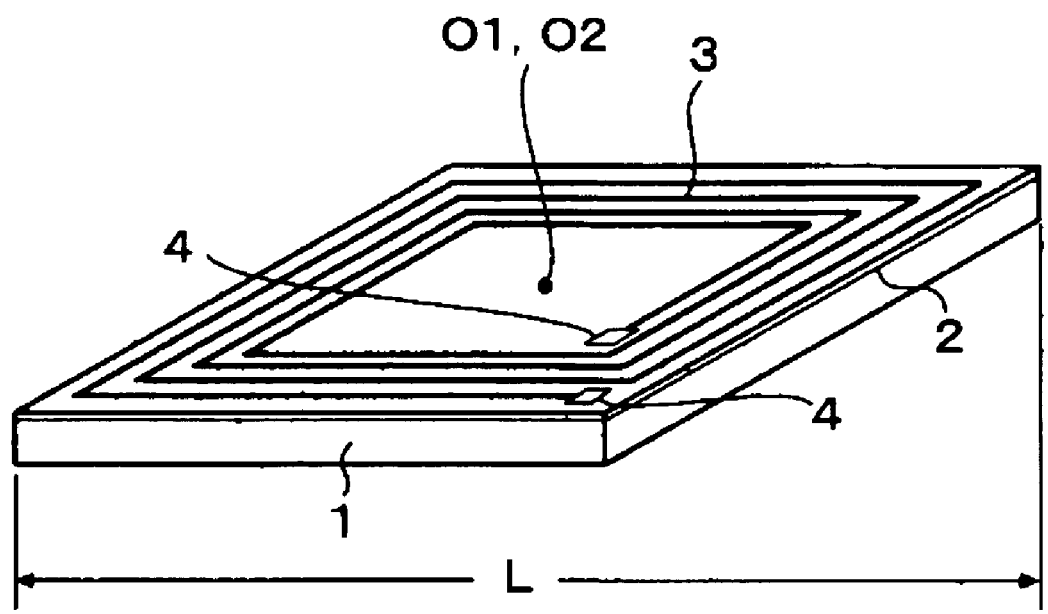
FIG. 1 is an enlarged perspective view of an IC chip for a contactless communication system information carrier according to a first embodiment of the present invention.
Figure 2:
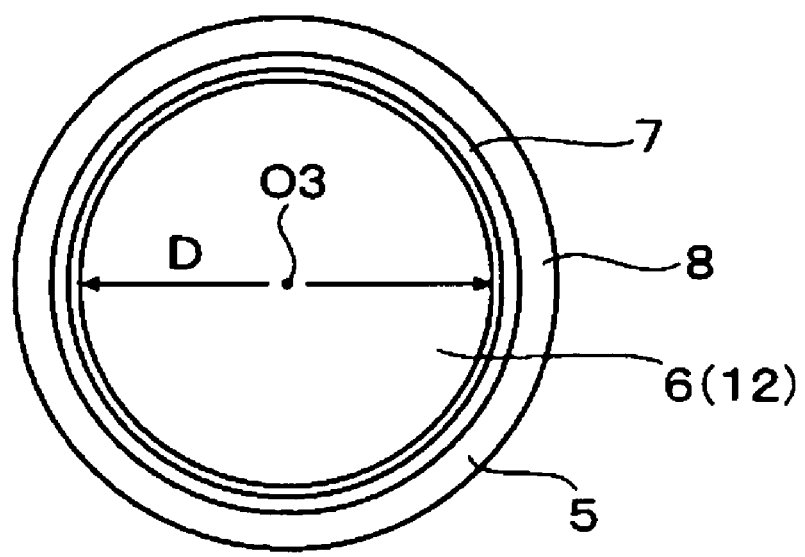
FIG. 2 is a plan view of a core piece body.
Figure 3:
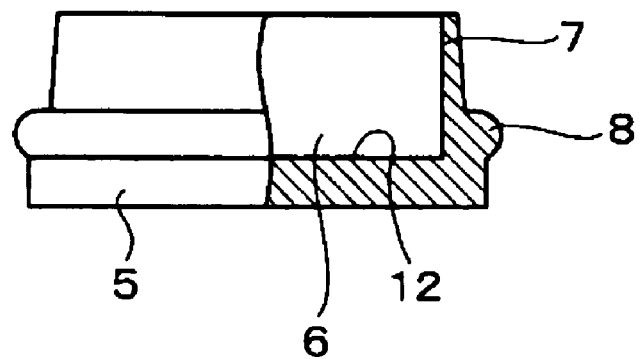
FIG. 3 is a partly sectional front view of the core piece body.
Figure 4:
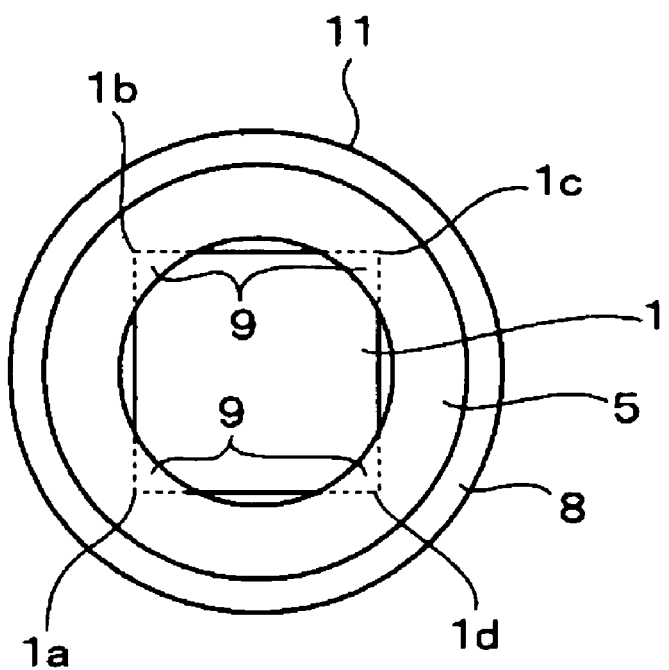
FIG. 4 is a plan view of a core piece.
Figure 5:
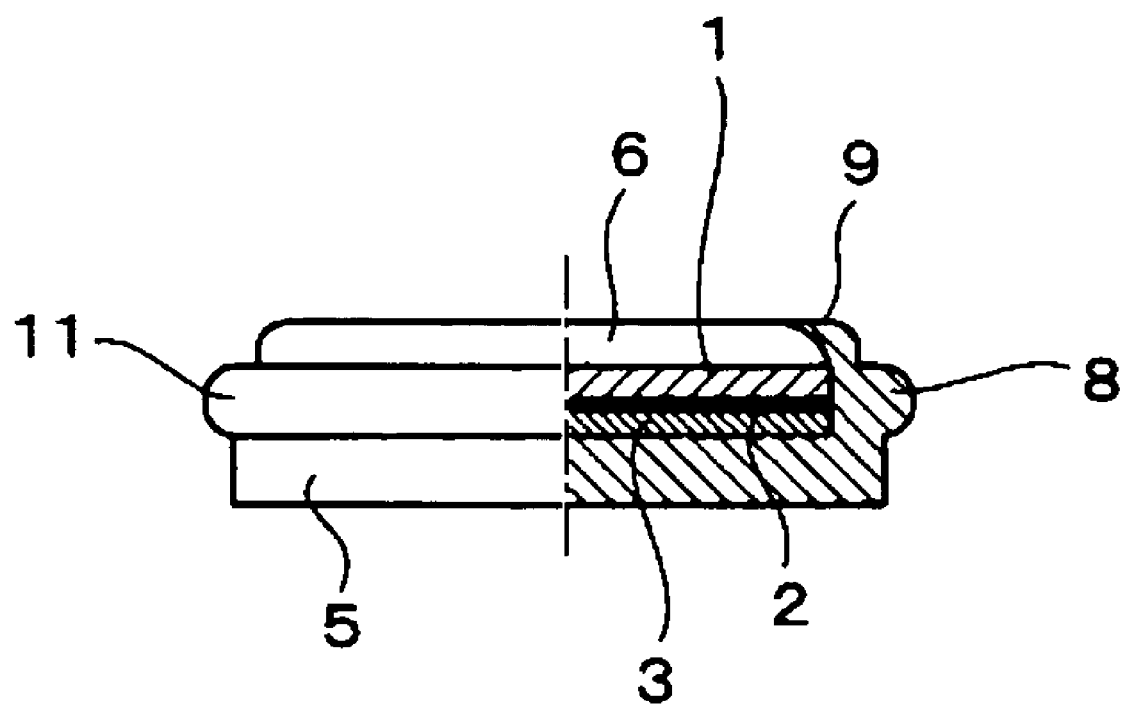
FIG. 5 is a partly sectional front view of the core piece.

Embodiments of the present invention are explained hereinafter with reference to the drawings. FIGS. 1 through 10 are views to explain a contactless communication system information carrier according to a first embodiment. FIG. 1 is an enlarged perspective view of an IC chip, FIG. 2 is a plan view of a core piece body, FIG. 3 is a partly sectional front view of the core piece body, FIG. 4 is a plan view of a core piece, and FIG. 5 is a partly sectional front view of the core piece.

Figure 6:
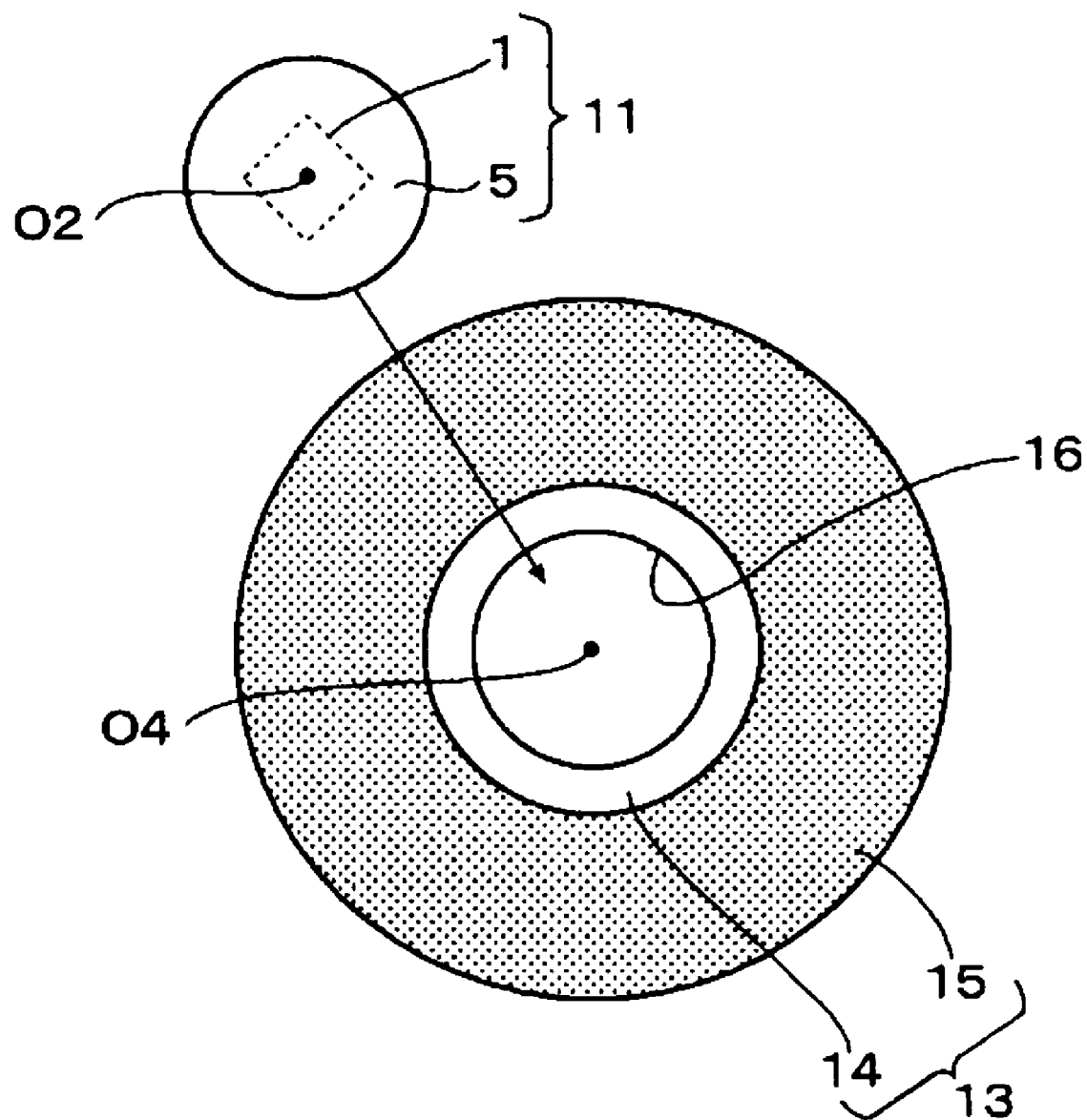
FIG. 6 is a plan view showing the state before the core piece is attached to a token.
Figure 7:
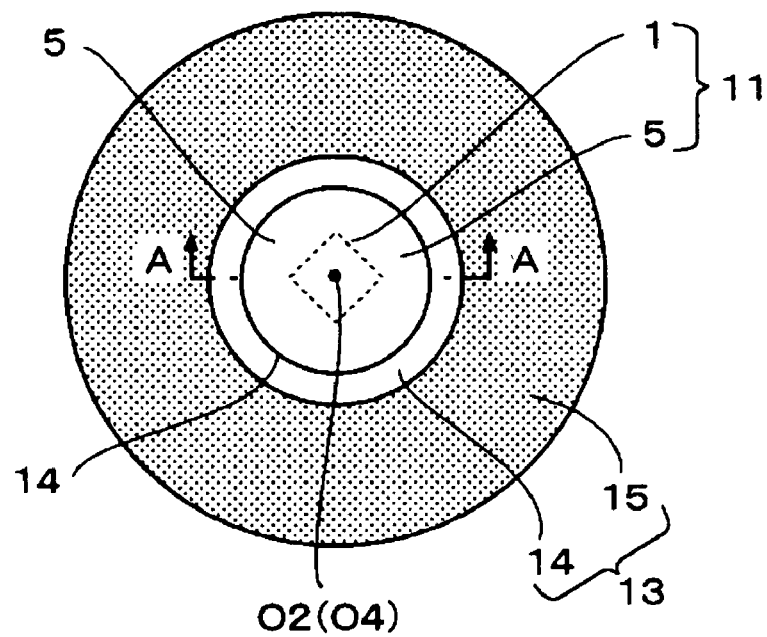
FIG. 7 is a plan view showing the state after the core piece is attached to the token.
Figure 8:
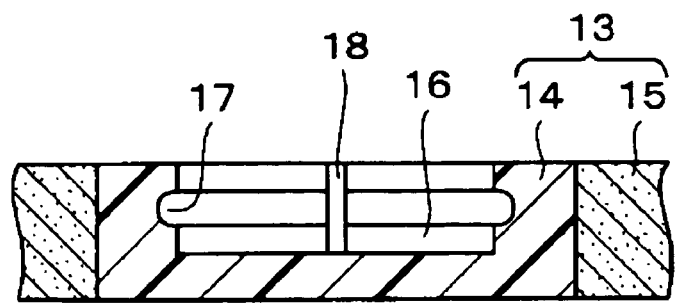
FIG. 8 is a fragmentary enlarged sectional view of the token before attachment.
Figure 9:
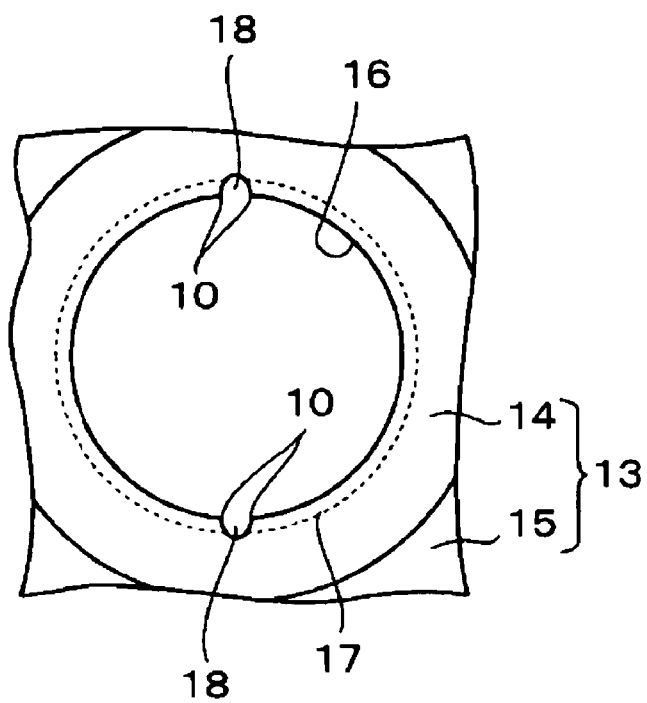
FIG. 9 is a fragmentary enlarged plan view of the token before attachment.
Figure 10:
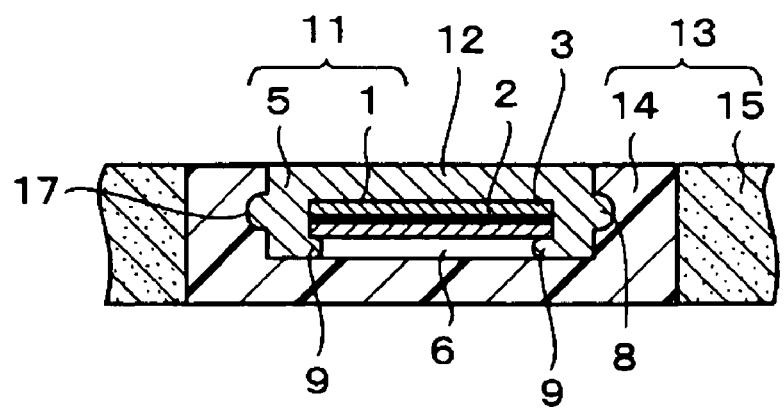
FIG. 10 is an enlarged sectional view along line A-A of FIG. 7.

FIG. 6 is a plan view showing the state before the core piece is attached to a token, which is used for electronic money transaction and so on, FIG. 7 is a plan view after the attachment, FIG. 8 is a fragmentary enlarged sectional view of the token before attachment, FIG. 9 is a fragmentary enlarged plan view of the token before attachment, and FIG. 10 is an enlarged sectional view along line A-A of FIG. 7, As shown in FIG. 1, the antenna coil 3 in a spiral shape is integrally formed with a circuit formation surface of a square-shaped IC chip 1 with an insulating layer 2, formed of a polyimide resin and so on, interposed therebetween. An antenna coil 3 may be formed by a method such as electroplating or photoresist. Both ends of the antenna coil 3 are connected to input/output terminals 4, 4, via through-holes formed in the insulating layer 2. The antenna coil 3 is formed above the IC chip 1 in such a way that the center O1 of the IC chip 1 corresponds to the roll center O2 of the antennal coil 3 in a rectangular spiral shape, as shown in FIG. 1.

The core piece body 5 is substantially cup-shaped, formed of a thermoplastic resin such as a polycarbonate resin or an epoxy resin. As shown in FIGS. 2 and 3, the core piece body 5 has a circular bottomed recess 6 in the center. A caulking allowance 7 is integrally formed on the periphery of the opening of the recess 6. The caulking allowance 7 may have one or a plurality of V- or U-shaped notches in the circumferential direction according to need. The outer peripheral surface of the core piece body 5 has one or a plurality of annular ribs 8 having a semicircular, triangular, or trapezoidal cross sectional shape.

The diameter D (see FIG. 2) of the recess 6 is designed to be substantially the same as the length L of the diagonal of the IC chip 1 shown in FIG. 1. Thus, when the IC chip 1 is placed inside the recess 6, the roll center O2 of the antenna coil 3 and the center 03 of the core piece body 5 correspond to each other. Thus, the antenna coil 3 (IC chip 1) is automatically positioned to the center of the core piece body 5.

The IC chip 1 is placed inside the recess 6 with the side of the antenna coil 3 facing down as shown in FIG. 5. An ultrasonic weld horn (not shown) is pressed against the core piece body 5 from above to heat to soften the caulking allowance 7 to caulk it inside, thereby forming a caulking part 9 that engages over four corners 1a to 1d of the IC chip 1 as shown in FIGS. 4 and 5.

Forming the notches as described above allows preventing wrinkling from being created when heating to soften the caulking allowance 7 to caulk it inside. The caulking part 9 which stretches long inward is thereby formed, which permits reliable fixation of the IC chip 1, even if it is small, inside the core piece body 5. Further, placing the IC chip 1 inside the recess 6 with the side of the antenna coil 3 facing down allows the antenna coil 3 to be closely in contact with the bottom surface 12 of the recess 6 and protected thereby. This prevents the antenna coil 3 from being damaged when supplied in bags or by parts feeder, giving protection effect. If the core piece body 5 is formed of transparent or semi-transparent plastic, it is possible to easily check whether the IC chip 1 is mounted or not, increasing convenience.

As described above, the core piece 11 is constituted by fitting the IC chip 1 inside the core piece body 5. Placing the IC chip 1 inside the recess 6 of the core piece body 5 allows protecting the antenna coil 3 and making an easily handled size. Thus, they can be mass-produced as the core piece 11 and mounted to a member to which the IC chip 1 is supposed to be mounted. Particularly, it is possible to protect, with the core piece 11, the IC chip corners 1a to 1d, which are easy to be chipped due to stress while handling the IC chip 1 or after fitted to an object product.

A token 13 used for electronic money transaction and so on is disk-shaped (coin-shaped) with the diameter of 30 mm and thickness of 2.5 mm, for example. The token 13 is composed of two members, a nonmetal spacer 14 placed inside and a metal weight 15 surrounding the outer periphery of the spacer 14.

The spacer 14 is, for example, formed of a synthetic resin such as acrylonitrile-butadiene-styrene resin (ABS resin), polybutylene terephthalate resin (PBT resin), polyphenylene sulfide resin (PPS resin), polycarbonate resin (PC resin), polyimide resin, and polypropylene resin.

In the case of forming the weight 15 with a single metal, tungsten (sp. gr. 19.24), lead (sp. gr. 11.34), nickel (sp. gr. 8.85), iron (sp. gr. 7.86), aluminum (sp. gr. 2.70), or stainless steel is used, for example. On the other hand, in the case of forming the weight 15 with a composition of a metal and a synthetic resin, a composition (mixture) of a metal (in the state of powder, narrow slip, fiber and so on) such as tungsten, lead, nickel, iron, aluminum, or stainless steel, and a synthetic resin such as acrylonitrile-butadiene-styrene resin (ABS resin), polybutylene terephthalate resin (PBT resin), polyphenylene sulfide resin (PPS resin), polycarbonate resin (PC resin), polyimide resin, and polypropylene resin is used, for example.

The appropriate content of the metal (in powder, narrow slip, fiber and so on) is about 20% to 70% by weight. For example, fine tungsten powder may be added and dispersed in ABS resin to make the weight 15 with the specific gravity of about 3.1.

A base resin that forms the spacer 14 and a base resin that forms the weight 15 may be the same or different. If the base resins of the spacer 14 and the weight 15 are the same, the spacer 14 and the weight 15 are securely attached since they have approximate physical properties.

The spacer 14 is forcedly fitted to a through hole in the center of the weight 15. The weight 15 thereby integrally supports the spacer 14.

Forming a large part of the token 13 with the metal weight 15 allows giving weight to the token 13 and protecting the core piece 11 and the spacer 14 from external force such as dropping impact.

The spacer 14 has a circular, bottomed fitting part 16 in the center. The fitting part 16 has an annular groove 17 on its inner periphery. The fitting part 16 also has one or a plurality of air vent grooves 18 (in this embodiment, two grooves placed oppositely, as shown in FIG. 9) extending from the bottom to the top opening.

The core piece 11 is forcibly fitted into the fitting part 16 of the token 13 as shown in FIGS. 6 and 7. If the air in the fitting part 16 is not sufficiently released at this point, the compressed air remains in the fitting part 16, causing the core piece 11 to be detached from the token 13 in the drop test of the assembled token. To avoid this, the air vent groove 18 is formed on the inner peripheral surface of the fitting part 16.

When the core piece 11 is forcibly fitted to the fitting part 16 of the token 13 as shown in FIG. 10, the annular rib 8 of the core piece body 5 is fitted to the annular groove 17 of the fitting part 16, and the outer peripheral surface of the core piece body 5 and the inner peripheral surface of the fitting part 16 are in close contact by plane. If the spacer 14 is formed of more rigid synthetic resin than the core piece body 5, an opening edge 10 (see FIG. 9) of the air vent groove 18 cuts into the annular rib 8 of the core piece body 5, making the attachment of the core piece body 5 and the token 13 (spacer 14) more secure.

As shown in FIG. 10, the core piece body 5 is mounted in such a way that the bottom 12 comes to the front side, which is, the antenna coil 3 is close to the front, and the surface of the bottom 12 does not project from the surface of the token 13. The antenna coil 3 is spaced from the metal weight 15 at a certain distance via the spacer 14 made of the synthetic resin.

As described earlier, since the fitting part 16 is formed in the center of the token 13, the center O4 of the token 13 and the center O2 of the IC chip 1 correspond to each other regardless of the direction of the IC chip (see FIGS. 6 and 7).

Second Embodiment

Figure 11:
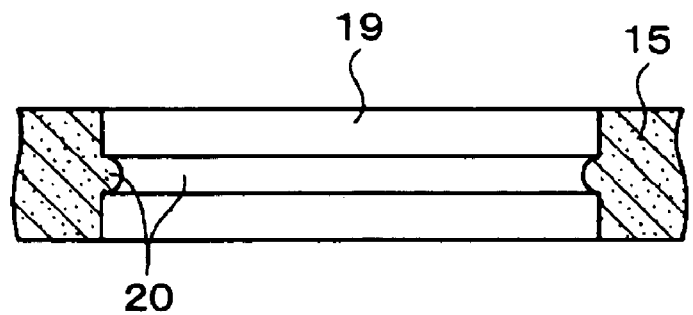
FIG. 11 is a fragmentary sectional view of the central part of a weight used in a contactless communication system information carrier according to a second embodiment of the present invention.
Figure 12:
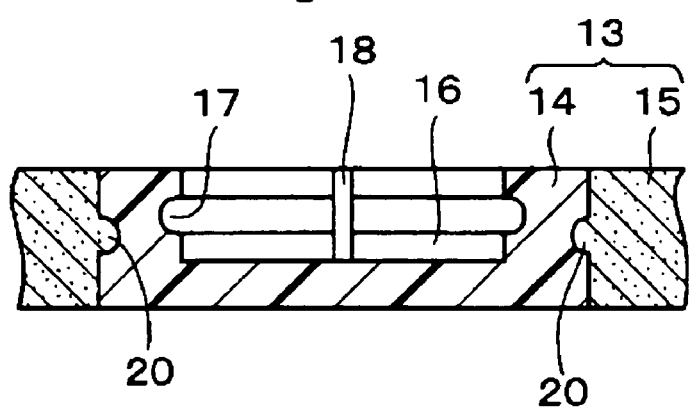
FIG. 12 is a sectional view showing the state where a spacer is forcedly fitted to the weight.
Figure 13:
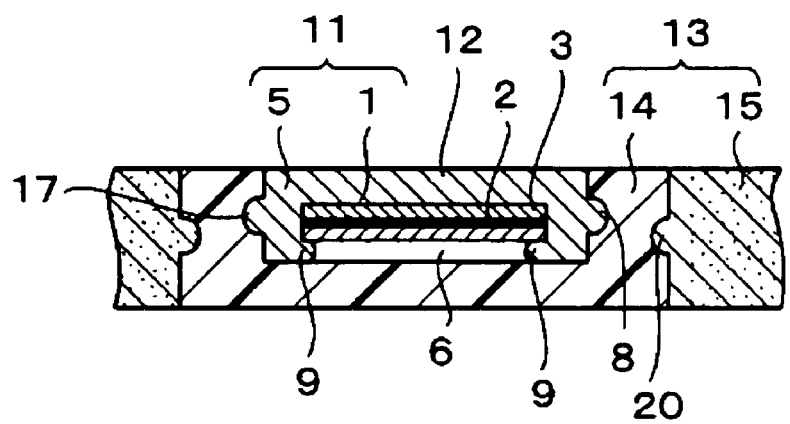
FIG. 13 is a sectional view showing the state where a core piece is forcedly fitted inside the spacer.

FIGS. 11 to 13 are views to explain a contactless communication system information carrier according to a second embodiment of the present invention. FIG. 11 is a fragmentary sectional view of the central part of a weight, FIG. 12 is a sectional view showing the state where a spacer is forcedly fitted to the weight, and FIG. 13 is a sectional view showing the state where a core piece is forcedly fitted inside the spacer.

This embodiment is different from the first embodiment in that one or a plurality of locking ribs 20 having semicircular, triangular, or trapezoidal cross sectional shape (one rib with a semicircular sectional shape in this embodiment) are formed along the inner peripheral surface of a through hole 19 in the center of the weight 15. Forming the locking rib 20 allows the spacer 14 and the weight 15 to be attached more securely since the locking rib 20 cuts into the outer peripheral part of the spacer 14 made of synthetic resin when the spacer 14 is forcibly fitted to the weight 15, as shown in FIG. 13.

Though the core piece 11 is forcibly fitted to the spacer 14 after the spacer 14 is forcibly fitted to the weight 15 in the first and second embodiments, the spacer 14 may be forcibly fitted to the weight 15 after the core piece 11 is forcibly fitted to the spacer 14.

Third Embodiment

Figure 14:
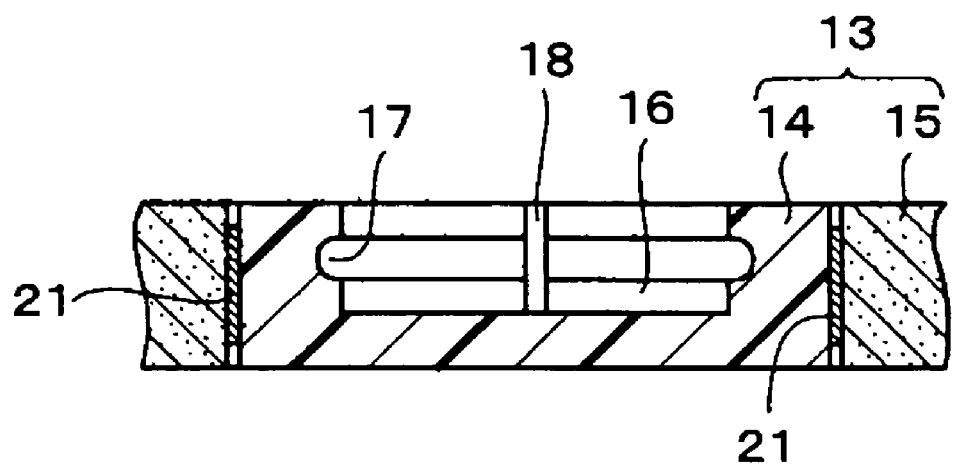
FIG. 14 is a fragmentary sectional view of the central part of a token used in a contactless communication system information carrier according to a third embodiment of the present invention.
Figure 15:
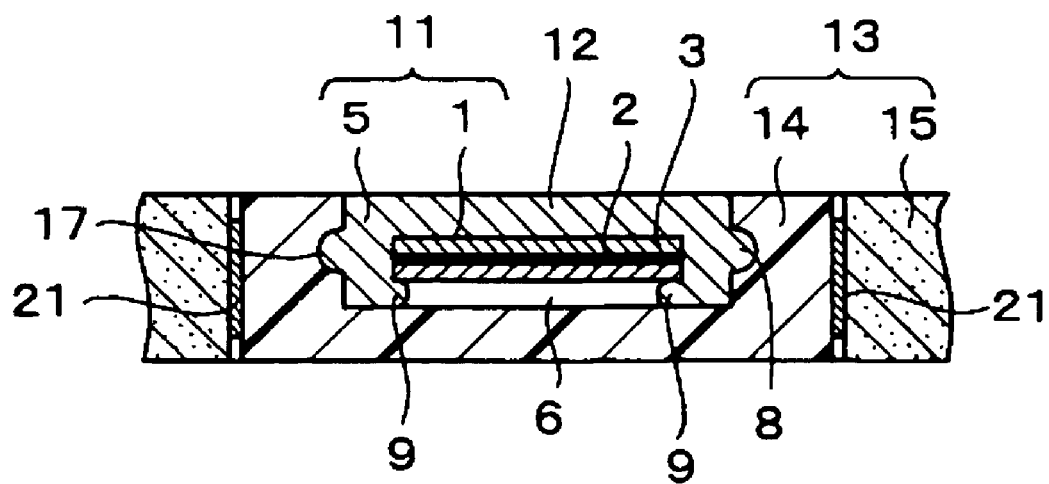
FIG. 15 is a sectional view showing the state where a core piece is forcedly fitted inside the token.

FIGS. 14 and 15 are views to explain a contactless communication system information carrier according to a third embodiment of the present invention. FIG. 14 is a fragmentary sectional view of the central part of a token, and FIG. 15 is a sectional view showing the state where the core piece is forcedly fitted inside the token.

This embodiment is different from the first embodiment mainly in that the spacer 14 and the weight 15 are integrated by an adhesive 21 such as epoxy adhesive or polyimide adhesive. In this embodiment, an adhesive receiver such as annular groove may be formed on the outer periphery of the spacer 14.

Fourth Embodiment

Figure 16:
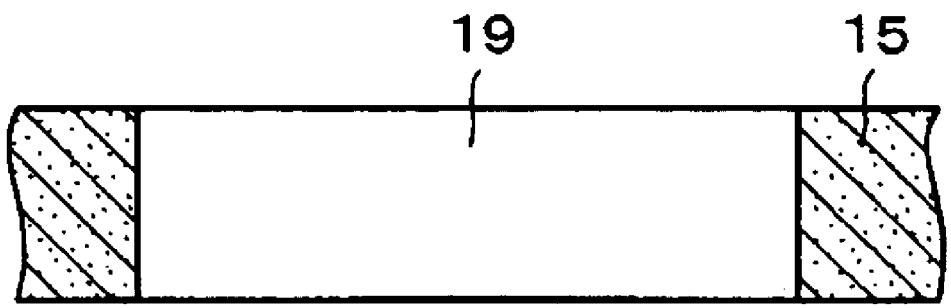
FIG. 16 is a fragmentary sectional view of the central part of a weight used in a contactless communication system information carrier according to a fourth embodiment of the present invention.
Figure 17:
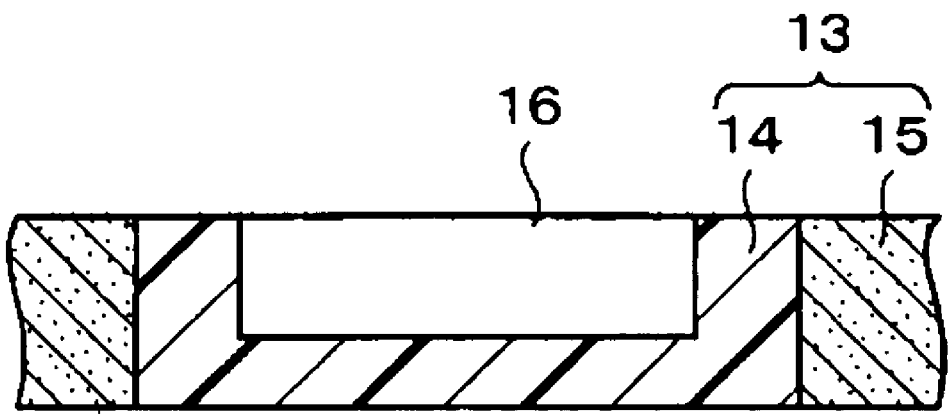
FIG. 17 is a sectional view showing the state where a spacer is insert-molded to the weight.
Figure 18:
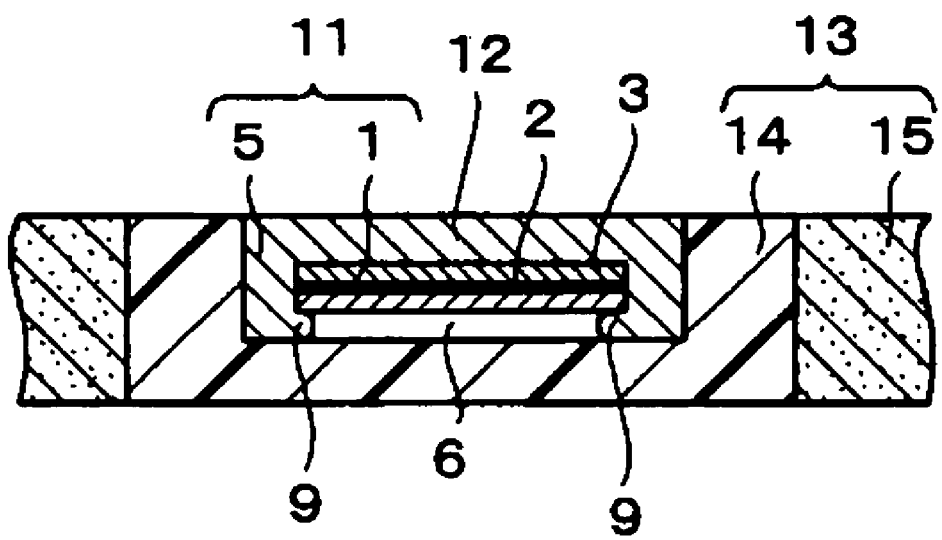
FIG. 18 is a sectional view showing the state where a core piece is forcedly fitted inside the spacer.

FIGS. 16 to 18 are views to explain a contactless communication system information carrier according to a fourth embodiment of the present invention. FIG. 16 is a fragmentary sectional view of the central part of a weight, FIG. 17 is a sectional view showing the state where a spacer is insert-molded to the weight, and FIG. 18 is a sectional view showing the state where a core piece is forcedly fitted inside the spacer.

A first difference between this embodiment and the first embodiment is that the metal weight 15 having a given shape is placed in a molding die and the spacer 14 made of a synthetic resin is insert-molded in a through-hole 19 (see FIG. 16) formed in the central part of the weight 15 (see FIG. 17).

A second difference is that the outer peripheral surface of the core piece 11 does not have the annular rib 8, and the outer peripheral surface of the core piece 11 is in close contact with the inner peripheral surface of the spacer 14 or integrated therewith by an adhesion.

Fifth Embodiment

Figure 19:
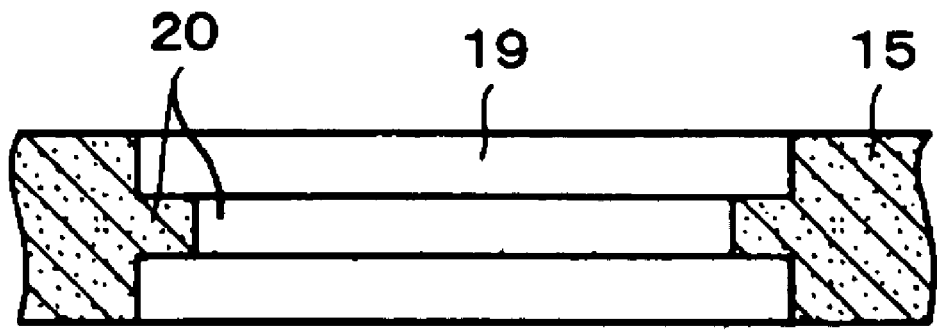
FIG. 19 is a fragmentary sectional view of the central part of a weight used in a contactless communication system information carrier according to a fifth embodiment of the present invention.
Figure 20:
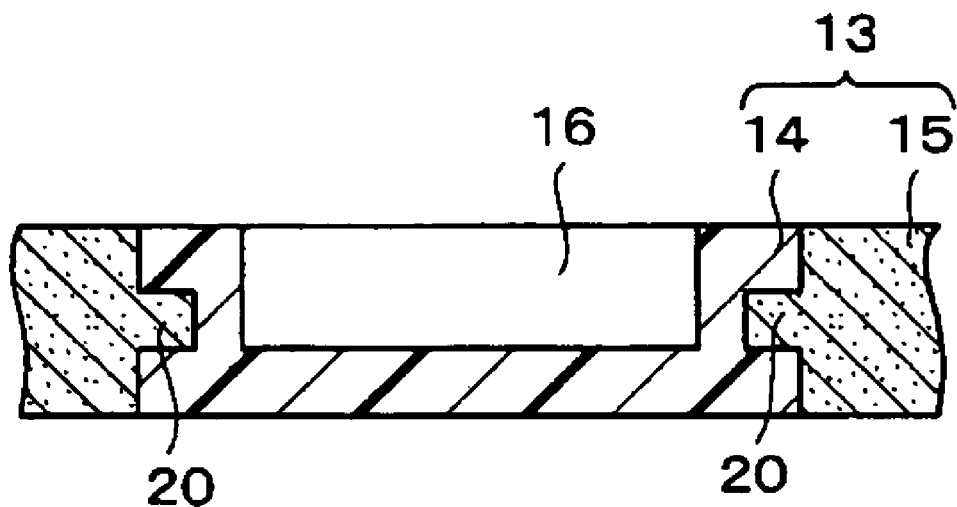
FIG. 20 is a sectional view showing the state where a spacer is insert-molded to the weight.
Figure 21:
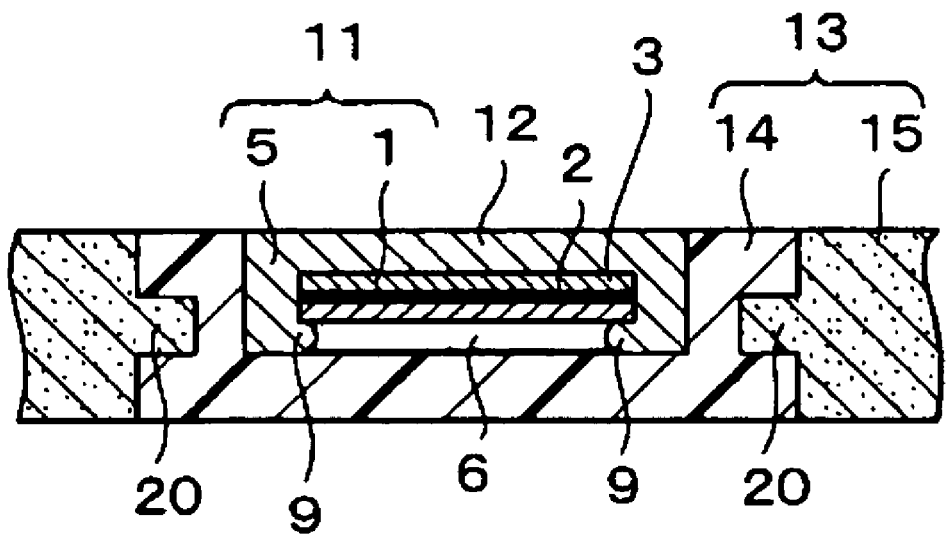
FIG. 21 is a sectional view showing the state where a core piece is forcedly fitted inside the spacer.

FIGS. 19 to 21 are views to explain a contactless communication system information carrier according to a fifth embodiment of the present invention. FIG. 19 is a fragmentary sectional view of the central part of a weight, FIG. 20 is a sectional view showing the state where a spacer is insert-molded to the weight, and FIG. 21 is a sectional view showing the state where a core piece is forcedly fitted inside the spacer.

This embodiment is different from the fourth embodiment in that one or a plurality of locking ribs 20 having a convex, semicircular, triangular, or trapezoidal cross sectional shape and so on (one rib with a convex sectional shape in this embodiment) are formed along the inner peripheral surface of the through hole 19 of the weight 15. Forming the locking rib 20 allows the spacer 14 and the weight 15 to be attached more securely since the locking rib 20 cuts into the outer peripheral part of the spacer 14 made of a synthetic resin when the spacer 14 is insert-molded to the weight 15, as shown in FIG. 20.

Figure 22:
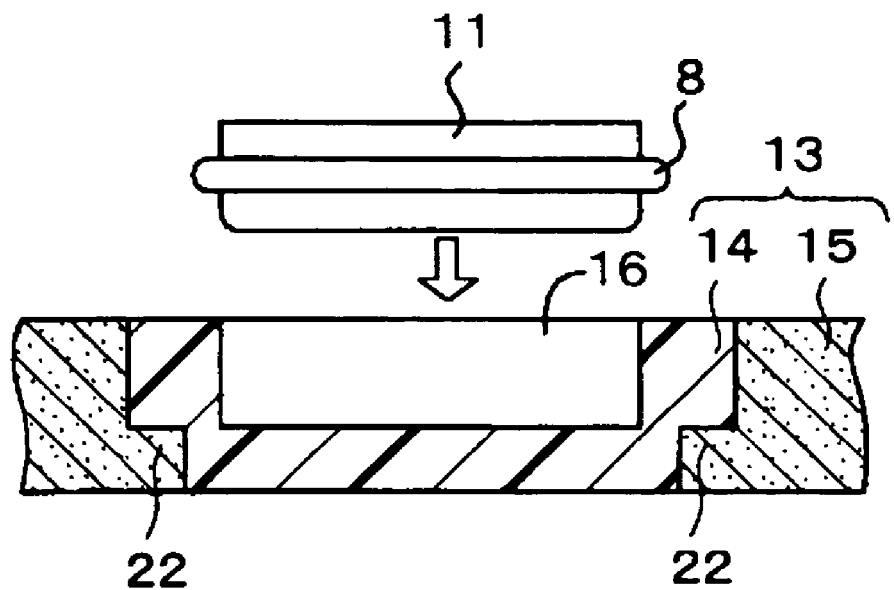
FIG. 22 is a sectional view showing the state before a core piece is forcedly fitted to a spacer in a contactless communication system information carrier according to a sixth embodiment of the present invention.

FIG. 22 is a sectional view to explain contactless communication system information carrier according to the sixth embodiment of the present invention. It shows the state before a core piece is forcedly fitted to a spacer.

Though the spacer 14 is insert-molded in the through hole 19 of the weight 15 in this embodiment also, a retaining rib 22 which projects in the inward radial direction is formed continuously or intermittently in the circumferential direction at the opening edge of the through hole 19 which is opposite to the side where the core piece 11 is inserted.

By insert-molding the spacer 14 with the weight 15 having the retaining rib 22, it is possible to surely prevent the spacer 14 from falling out of the weight 15 when forcibly fitting the core piece 11 instantaneously inside the spacer 14 as shown in FIG. 22.

Seventh Embodiment

Figure 23:
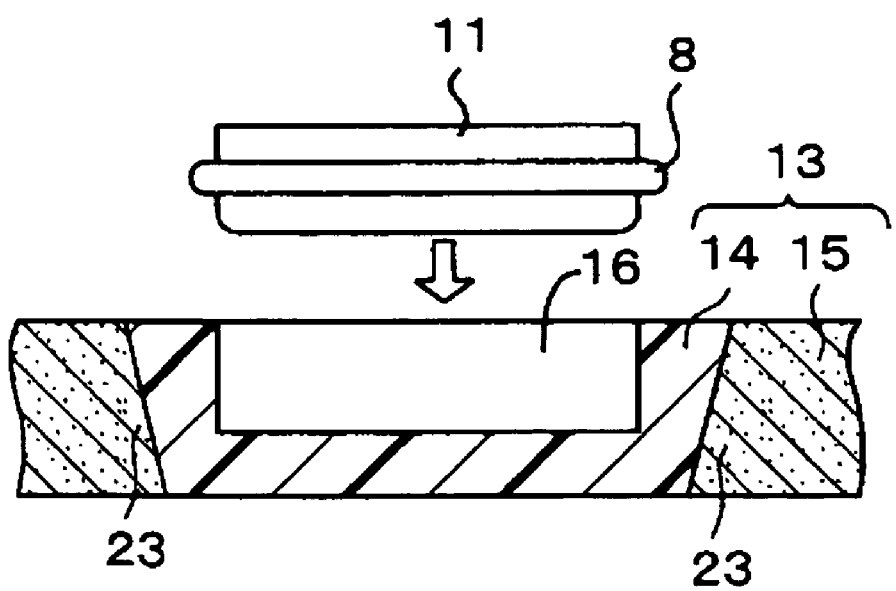
FIG. 23 is a sectional view showing the state before a core piece is forcedly fitted to a spacer in a contactless communication system information carrier according to a seventh embodiment of the present invention.

FIG. 23 is a sectional view to explain a contactless communication system information carrier according to a seventh embodiment of the present invention. It shows the state before a core piece is forcedly fitted to a spacer.

This embodiment is different from the sixth embodiment in that a tapered portion 23 to gradually reduce the diameter in the insertion direction of the core piece 11 is formed instead of the retaining rib 22.

By forming the tapered portion 23 that gradually reduces the diameter in the insertion direction of the core piece 11, it is possible to prevent the spacer 14 from falling out. Further, it is possible to more closely contact the outer peripheral surface of the spacer 14 to the tapered portion 23 of the weight 15 by the suppress strength in the forcible fitting of the core piece 11.

Figure 24:
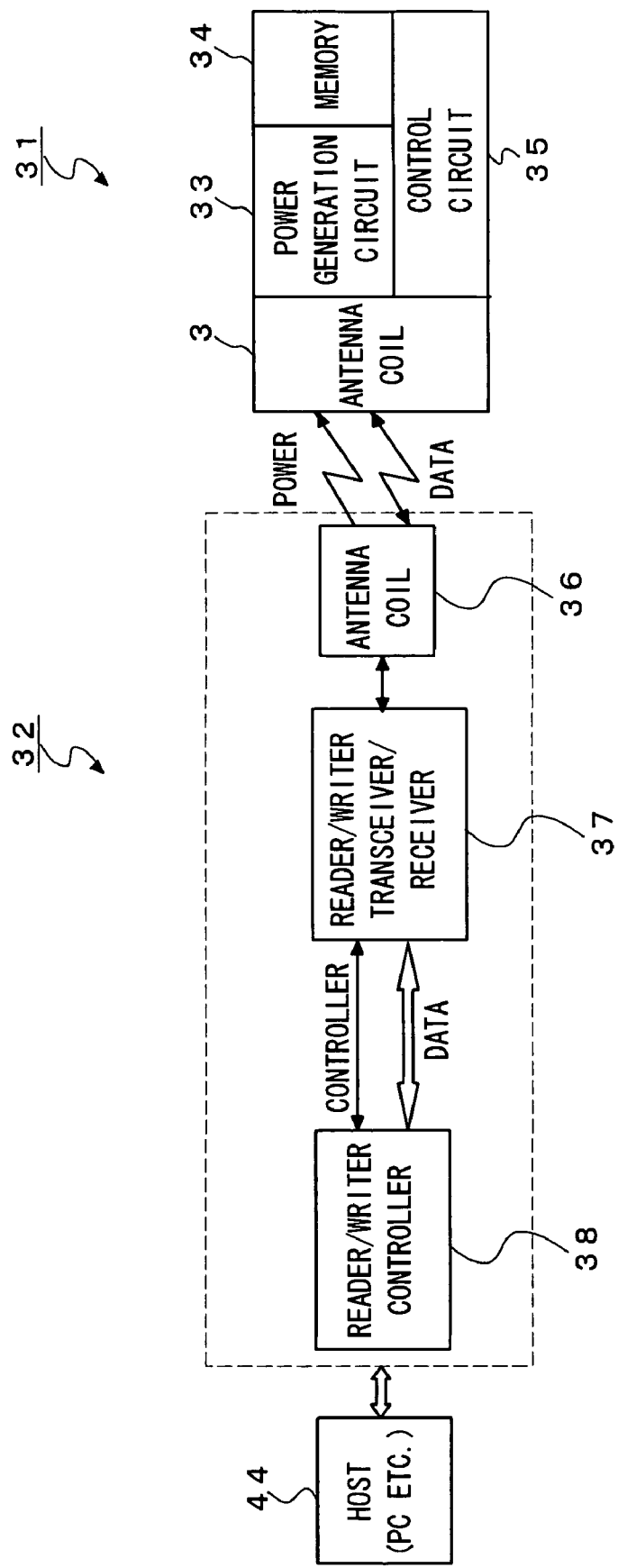
FIG. 24 is a block diagram showing data transmission system among a contactless communication system information carrier according to the present invention, a reader/writer, and a host computer.

FIG. 24 is a block diagram showing data transmission system among a contactless communication system information carrier 31 according to the present invention, a reader/writer 32, and a host computer 44. The information carrier 31 includes the antenna coil 3, a power generation circuit 33, a memory 34, a control circuit 35 and so on. The reader/writer 32 includes an antenna coil 36 corresponding to the antenna coil 3 of the information carrier 31, a transceiver/receiver 37, a controller 38 and so on. These parts are connected as shown in the figure.

Figure 25:
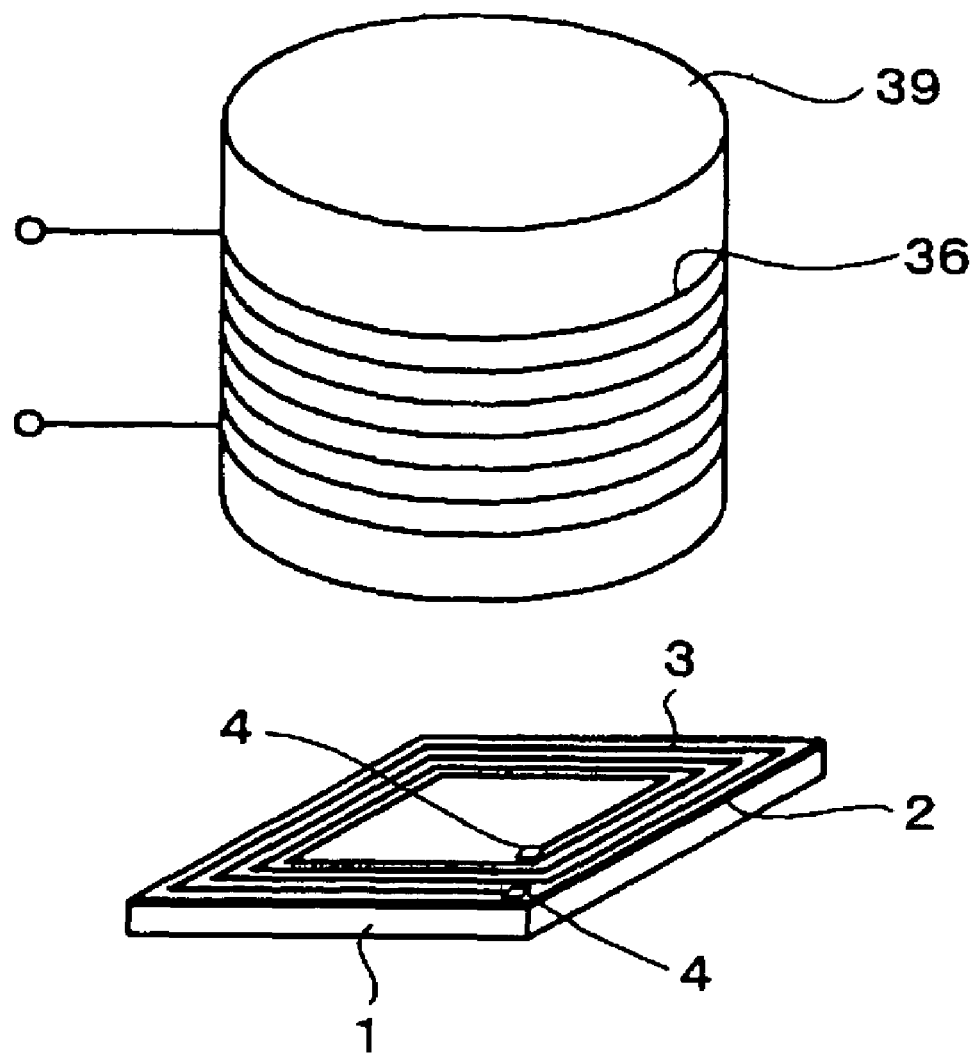
FIG. 25 is a view showing the correspondence between an antenna coil of a contactless communication system information carrier and an antenna coil of a reader/writer.
Figure 26A:
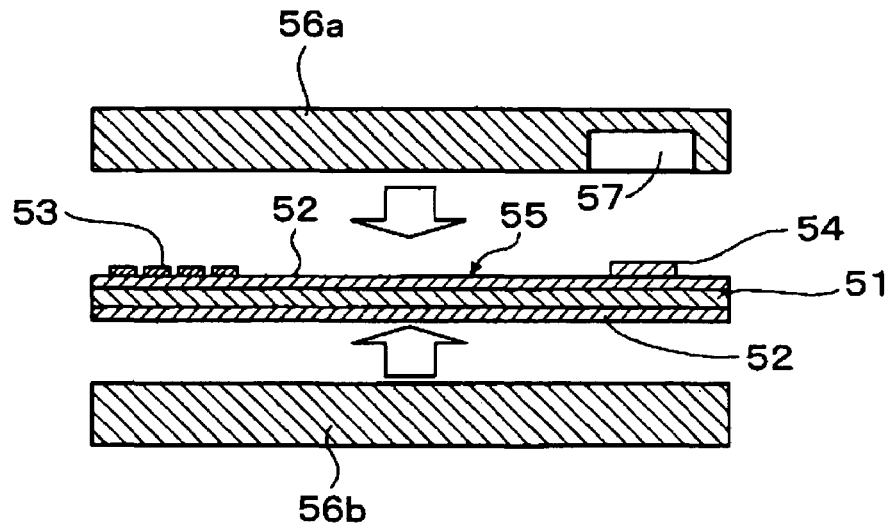
FIGS. 26A and 26B are sectional views to explain a coin IC tag which has been conventionally proposed.
Figure 26B:
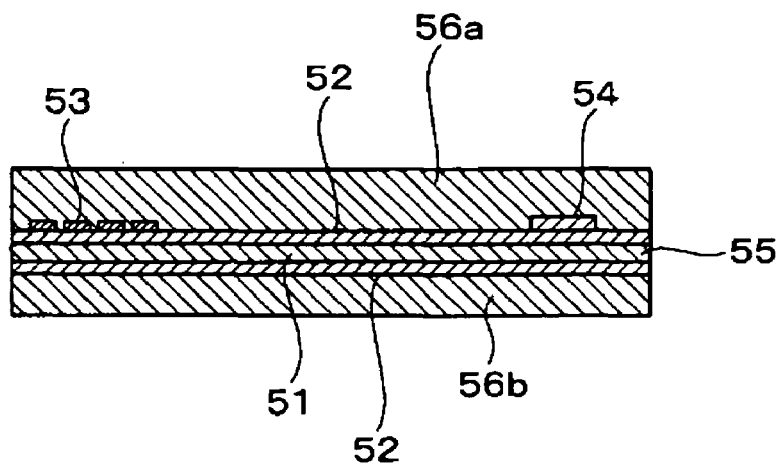

FIG. 25 is a view showing the correspondence between the antenna coil 3 of the information carrier 31 and the antenna coil 36 of the reader/writer 32. The antenna coil 36 is wound around the side surface of a columnar ferrite core 39 having the substantially the same under surface size as the outer shape of the antenna coil 3. The axis of the ferrite core 39 is perpendicular to the plane of the antenna coil 3, and the under surface of the ferrite core 39 is in close proximity to the antenna coil 3.

A token 13 attached to the reader/writer 32 is positioned by a guide means (not shown) in such a way that the center of the token 13 (the center of the antenna coil 3) corresponds to the center of the under surface of the ferrite core 39. Thus, the antenna coil 3 and the antenna coil 36 are electromagnetically coupled to allow data transmission, regardless of the direction of the token 13 (antenna coil 3) on the plane.

Though the spacer 14 is more rigid than the core piece body 5 in the above embodiments, it is possible to use super engineering plastic such as polyphenylene sulfide resin (PPS resin) or polyetherimide resin (PEI resin) for the core piece body 5, and use ABS resin for the spacer 14 so that the core piece body 5 is more rigid than the spacer 14.

This allows protecting the IC chip 1 to avoid chip out or circuit breakdown of the IC chip in spite of stress applied to the core piece body 5 when fitting the core piece 11 to the fitting part 16 of the spacer 14 or during use after the fitting.

Although the annular rib 8 is formed in the core piece body 5 and the annular groove 17 is formed in the spacer 14 in the above embodiments, the annular groove 17 may be formed in the core piece body 5 and the annular rib 8 may be formed in the spacer 14.

The fitting part 16 which is a bottomed recess is formed in the spacer 14 in the above embodiment; however, the fitting part may be a through hole penetrating from the top surface to the under surface of the spacer.

Though the air vent groove 18 is formed in the spacer 14 in the above embodiments, the air bent groove may be formed in the core piece body 5.

The contactless communication system information carrier of this invention is not limited to the application to the token as described in the above embodiments. It allows attachment to a small area where the attachment has been impossible, such as card, DNA chip, case for storing test objects such as test tube and inspection piece, connector, frame, case of electronic card of PC card specification, Compact Flash® specification and so on, point of pen-shaped pointing device, junction conneter of LAN cable and optical cable, key of automobile and so on, and bodies and cases of optical disk, magnetic disk and tape medium.

INDUSTRIAL APPLICABILITY

The contactless communication system information carrier according to the present invention is, for example, applicable to parts or products where an IC chip having an antenna coil is mounted. For instance, it is useful for an IC chip having an antenna coil which is embedded in a personal identification card.

The invention claimed is:

1. A contactless communication system information carrier, comprising:
   a core piece in which an integrated circuit chip with an antenna coil integrally formed on one surface is fitted inside a recess of a core piece body;
   a non-metal spacer in which the core piece is fitted to a fitting part located in a center of the spacer to retain the core piece; and
   a metal weight which is placed and coupled so as to surround an outer periphery of the spacer,
   wherein the antenna coil and the metal weight are separated from each other via the spacer.

2. The contactless communication system information carrier according to claim 1, wherein the fitting part of the spacer comprises a bottomed recess or a through hole, and the core piece body is forcibly fitted into the fitting part.

3. The contactless communication system information carrier according to claim 2, wherein an outer peripheral surface of the core piece body has an annular convex portion or an annular groove, an inner peripheral surface of the fitting part of the spacer has an annular groove or an annular convex portion, and the annular convex portion and the annular groove are fitted to each other.

4. The contactless communication system information carrier according to claim 1, wherein the fitting part of the spacer comprises a bottomed recess, and an inner peripheral surface of the fitting part or an outer peripheral surface of the core piece body has an air vent groove.

5. The contactless communication system information carrier according to claim 1, wherein the weight has a through hole in a center part thereof, and a spacer made of a synthetic resin is forcibly fitted into the through hole.

6. The contactless communication system information carrier according to claim 5, wherein an inner peripheral surface of the through hole has a locking rib, which cuts into an outer peripheral surface of the spacer when the spacer is forcibly fitted into the through hole.

7. The contactless communication system information carrier according to claim 1, wherein the weight has a through hole in a center part thereof, and a spacer made of a synthetic resin is insert-molded into the through hole.

8. The contactless communication system information carrier according to claim 7, wherein an inner peripheral surface of the through hole has a locking rib, which cuts into an outer peripheral surface of the spacer when the spacer is forcibly fitted into the through hole.

9. A contactless communication system information carrier, comprising:
   a core piece in which an integrated circuit chip in which an antenna coil for contactless communication is integrally formed on one surface is fitted inside a recess of a core piece body;
   a non-metal resin member which packages the core piece; and
   a weight which is made of a composition of a metal and a synthetic resin, and is placed and coupled so as to surround the resin member,
   wherein the antenna coil and the metal weight are separated from each other via the resin member.

10. The contactless communication system information carrier according to claim 9, wherein the contactless communication system information carrier is coin-shaped, and the integrated circuit chip is mounted in a central part of the contactless communication system information carrier.

11. A contactless communication system information carrier, comprising:
    a core piece in which an integrated circuit chip with an antenna coil integrally formed on one surface is fitted inside a recess of a core piece body;
    a spacer which is made of a synthetic resin not including a metal, in which the core piece is fitted to a fitting part located in a center the spacer to retain the core piece; and
    a weight which is made of a composition of a metal and a synthetic resin, and is placed to surround an outer periphery of the spacer,
    wherein the spacer and the weight are formed by coin-jection molding, and the antenna coil and the metal weight are separated from each other via the spacer.

12. The contactless communication system information carrier according to claim 11, wherein the fitting part of the spacer comprises a bottomed recess or a through hole, and the core piece body is forcibly fitted into the fitting part.

13. The contactless communication system information carrier according to claim 12, wherein an outer peripheral surface of the core piece body has an annular convex portion or an annular groove, an inner peripheral surface of the fitting part of the spacer has an annular groove or an annular convex portion, and the annular convex portion and the annular groove are fitted to each other.

14. The contactless communication system information carrier according to claim 11, wherein the fitting part of the spacer comprises a bottomed recess, and an inner peripheral surface of the fitting part or an outer peripheral surface of the core piece body has an air vent groove.

* * * * *